United States Patent [19]

Desjardins

[11] Patent Number: 4,896,746

[45] Date of Patent: Jan. 30, 1990

[54] COVERED STORAGE FUNNEL

[76] Inventor: Warren Desjardins, 128 Engelke St., Patchogue, N.Y. 11772

[21] Appl. No.: 237,281

[22] Filed: Aug. 26, 1988

[51] Int. Cl.[4] ...................... F16N 11/00; F16N 33/00; F01M 11/04

[52] U.S. Cl. .................................... 184/92; 184/105.1; 184/88.1; 184/1.5; 123/196 R; 123/198 E

[58] Field of Search ....................... 184/88.1, 88.2, 90, 184/92, 1.5, 80, 105.1, 84; 123/196 R, 196 W, 196 S, 198 E, 195 C

[56] References Cited

U.S. PATENT DOCUMENTS

| | | | |
|---|---|---|---|
| 49,352 | 8/1865 | Poole | 184/90 |
| 243,316 | 6/1881 | Shaffer | 184/92 |
| 1,410,398 | 3/1922 | Fixary | 184/93 |
| 1,507,658 | 9/1924 | Bergmann | 184/88.1 |
| 1,514,674 | 11/1924 | Sands | 184/88.1 |
| 1,938,476 | 12/1933 | Allen | 184/92 |
| 4,346,680 | 8/1982 | Boychuk | 123/96 W |
| 4,517,939 | 5/1985 | Klyooka | 123/198 E |
| 4,739,861 | 4/1988 | Desjardins | 184/105.1 |

*Primary Examiner*—Henry A. Bennet
*Assistant Examiner*—Denise L. Ferensic
*Attorney, Agent, or Firm*—Richard L. Miller

[57] ABSTRACT

This storage funnel is designed to retain oil or a gasoline mixture for dispensing into an engine or tank, and is also employed to store parts, etc. Primarily, it consists of a housing that serves as a reservoir for the oil or fuel mixture which will be dispensed by the operator through the employment of a rotatable valve in the housing. The funnel housing also includes a cover over the oil or fuel mixture that is pivotal, and a filler neck is included in the cover for filling the reservoir, a cap being provided on the filler neck for closure and which is opened to serve as a vent when the oil or fuel mixture is being dispensed. A second outer cover is also provided to cover articles stored on top of the other cover.

2 Claims, 1 Drawing Sheet

FIG. 1
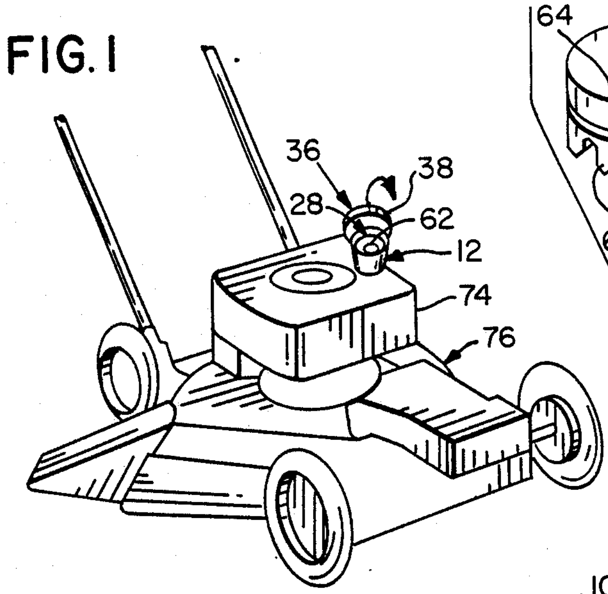
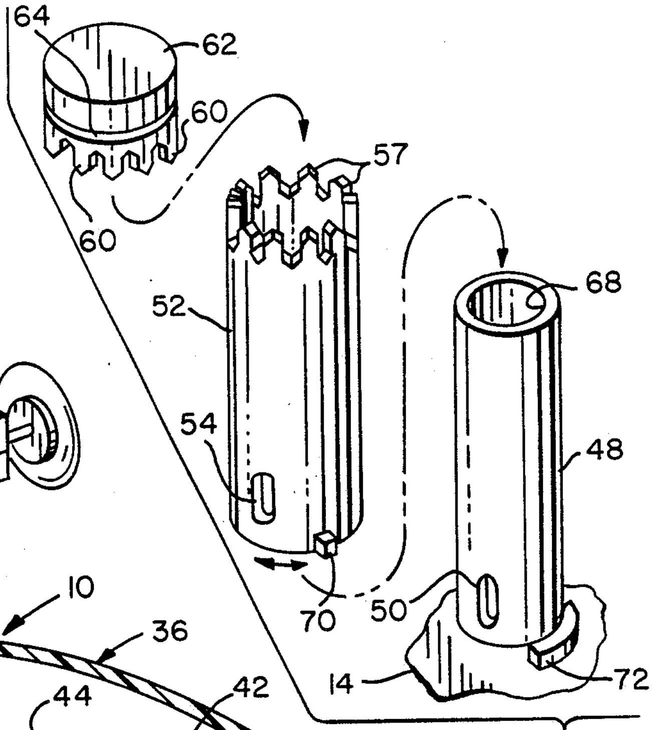
FIG. 3
FIG. 2
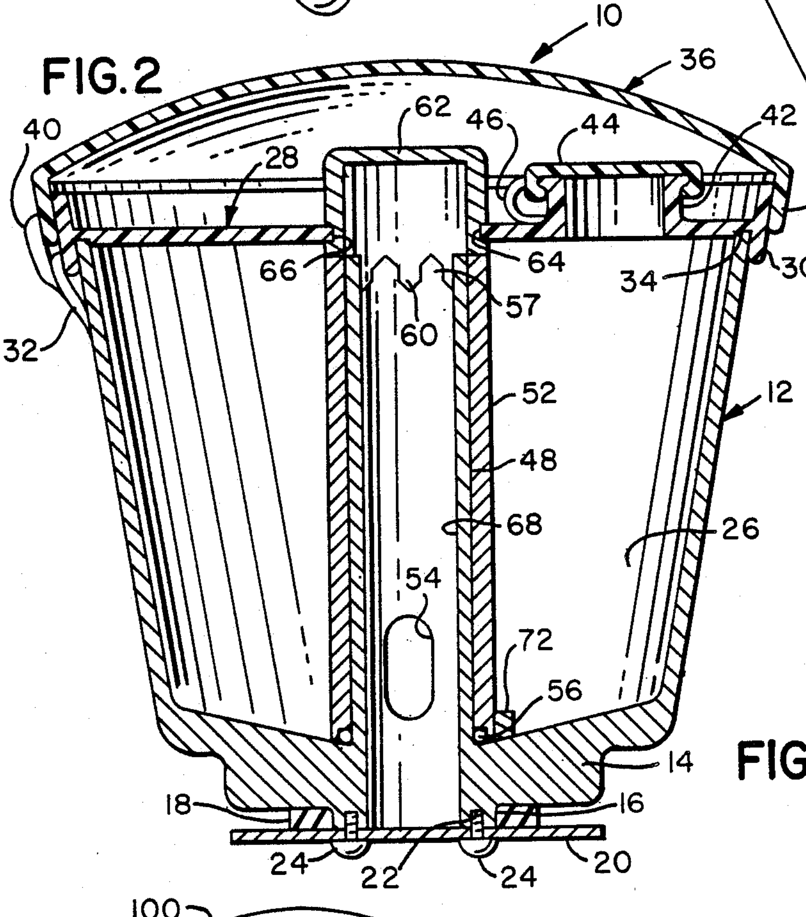
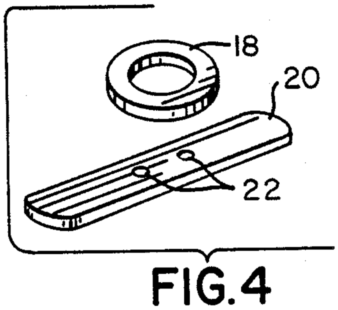
FIG. 4
FIG. 5
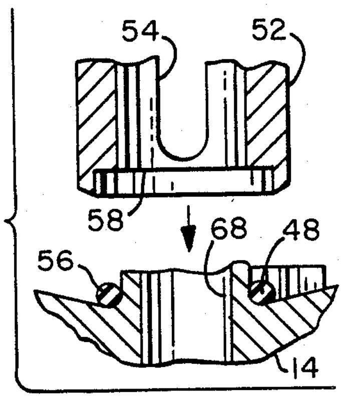
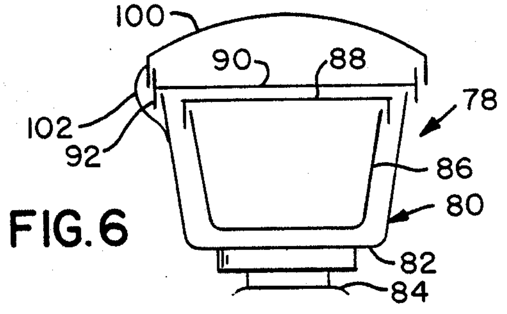
FIG. 6
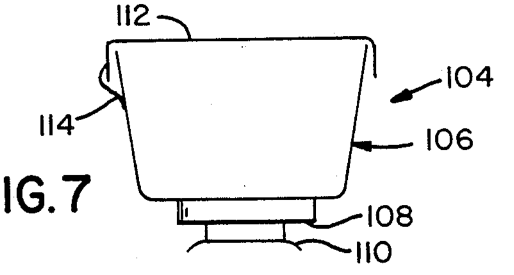
FIG. 7

COVERED STORAGE FUNNEL

BACKGROUND OF THE INVENTION

The instant invention relates generally to funnels, and more particularly, to a covered storage funnel. For example U.S. Pat. No. 4,739,861 by Warren Desjardins the present inventor is illustrative of such art. Numerous funnels have been provided in the prior art that are adapted to handle fluids etc. While these units may be suitable for the particular purpose to which they address, they would not be as suitable for the purpose of the present invention as hereafter described.

SUMMARY OF THE INVENTION

A primary object of the present invention is to provide a covered storage funnel that will overcome the shortcomings of the prior art devices.

Another object is to provide a covered storage funnel that will be of such design, as to be employed on engines and lawn mower for adding oil or fuel as needed.

Another object is to provide a covered funnel that will be so designed, as to attach to a filler neck of a lawn mower and the like that will provide a reservoir for a fuel to be released when necessary, without spillage on a mower or other machine when it is hot, thus preventing fire.

A still further object is to provide a storage funnel in which, parts and other articles may be stored in a top portion of the device.

An additional object is to provide a covered storage funnel that may be employed by landscapers to give to employees the funnel being pre-filled with a correct mixture of fuel and oil for placement on two-cycle engine equipment.

A further object is to provide a covered storage funnel that is simple and easy to use.

A yet still further object is to provide a covered storage funnel that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of a typical lawn mower, showing the instant invention installed thereon with the top cover open;

FIG. 2 is vertical cross sectional view of the instant invention, shown per se;

FIG. 3 is a fragmentary exploded perspective view showing an internal sleeve and valve structure;

FIG. 4 is a fragmentary exploded perspective view of the tank engagement mechanism;

FIG. 5 is a fragmentary vertical exploded elevational view showing a portion of the sleeve and valve structure in greater detail;

FIG. 6 is a diagrammatic side elevational view of a second embodiment of the invention; and FIG. 7 is a diagrammatic side elevational view of a third embodiment of the invention.

DETAILED DESCRIPTION OF THE PREFERRED EMBODIMENTS

Turning now descriptively to the drawings, in which like reference characters denote like elements throughout the several views, a funnel 10 is shown to include a conical housing 12 having an integrally attached bottom wall 14 with a neck 16 that receives a rubber washer 18 that engages with bottom wall 14 and a plate 20 that serves to lock housing 12 in a typical filler neck (not shown) of an engine of a fuel tank or the like. A pair of openings 22 are provided through neck 16 and plate 20 for receiving screw fasteners 24 that hold plate 20 in engagement with washer 18, and the compartment 26 is the reservoir for the oil or fuel received in housing 12.

It is to be noted that several sizes of washers 18 and plates 20 which are interchangeable, may be supplied with the device in order to enable the user the capability of securing the instant invention to various size machinery fill ports.

A lower first cover 28 is provided and includes an annular flange 30 that frictionally engages with the outer periphery of housing 12, and a flexible first hinge 32 is fixedly secured to the outer periphery of flange 30 of cover 28, enabling cover 28 to pivot open and closed. An annular groove 34 is also provided in the bottom of cover 28 and engages with the upper rim of housing 12. The lower first cover 28 serves to confine the oil or fuel within compartment 26, and also serves as a tray for supporting nuts, bolts and other articles (not shown). It is to be further understood that the entire device might be molded of any of a number of suitable plastic materials too numerous to mention.

An upper second cover 36 is provided with an annular flange 38 for frictional engagement with flange 30 of cover 28, and a second hinge 40 is fixedly secured to flange 38 and the outside of hinge 32, for enabling opening and closing of cover 36 that serves to confine the nuts, bolts, keys and/or other articles.

A filler neck 42 integrally attached to and projecting upward from cover 28, provides for the filling of the compartment 26 with oil, fuel, or a mixture of fuel and oil as desired, or in the alternative for venting the device while preventing catastrophic accidental spills. The upper rim of filler neck 42 is beaded for snappingly engaging with a grooved cap 44 that is fixedly secured to a flexible hinge 46 that is also fixedly secured to the top surface of cover 28.

A sleeve 48 is integrally attached at one end to a sloped surface of bottom wall 14 that includes an opening 50 through its bottom portion, for a purpose which hereinafter will be described.

Sleeve 48 is freely received in an outer sleeve 52 that includes a similar opening 54 that may be aligned with opening 50 of sleeve 48, and a rubber O-ring 56 is received in an annular groove 58 in the bottom of sleeve 52, and serves as a seal against leakage of fluid.

A plurality of spaced teeth 57 are provided in the top of sleeve 52 for engagement with similar teeth 60 provided on the bottom of a valve cap 62.

Valve cap 62 includes an annular groove 64 that receives the edge of opening 66 freely, and valve cap 62 is employed to rotate outer sleeve 52 for the alignment of the openings 50 and 52, for fluid flow from compartment 26 down through the bore 68 of sleeve 48. The combination of sleeve 48, outer sleeve 52, and the valve cap 62 serve as a rotary valve for the operation of funnel 10, and a projecting abutment 70 is fixedly secured to the outer periphery of outer sleeve 52, for engagement with a stop member 72 that is projecting from and fixedly secured to the top surface of bottom wall 14 of housing 12.

In use, the conventional cap (not shown) is removed from the fuel tank 74 of a lawn mower 76 in this instance, and funnel 10 is placed bottom wall 14 downward and engaged in the filler neck (not shown) of the tank 74, in the same manner as was described of the above mentioned conventional cap.

Grooved cap 44 of filler neck 42 of funnel 10 is then opened by pivoting upward, and a gasoline, oil, or an oil mixture are poured therein where it is stored in the compartment 26. After the above, groove cap 44 is pivoted closed.

Funnel 10 may also be pre-filled and then put into place, and when employing the valve portion in the center of the funnel 10 for dispensing fluid therefrom, it may be desirable to pivot the grooved cap 44 open to serve as a vent.

To release the fluid, cap 62 is grasped and rotated until the projecting abutment 70 engages with the stop member 72, which is that point where the openings 50 and 52 align with each other for the passage of the fluid therethrough and down through the bore 68. To shut the valve, the opposite direction of rotation is effected.

Referring now to FIG. 6, a modified form of funnel 78 is shown to include a housing 80 having a bottom wall with an attached plate 84 for use in securing funnel 78 in a filler neck. A container 86 is removably received in the interior of housing 80 and serves to hold spark plugs, a spare key, etc. Container 86 is also supplied with a removable cover 88, and a pivotal cover 90 is secured to the housing 80. The top of cover 90 serves as a tray support for other articles, and a second and top cover 100 is provided and is secured to another hinge 102 that is secured to hinge 92, enabling both covers 90 and 100 to pivot open.

In use, funnel 78 is employed as a funnel for oil or fuel in a conventional manner, the exception being, that the container 86 is insertable therein and 78 employs the two covers 88 and 100 for a second storage compartment.

Looking now at FIG. 7, a second modified form of funnel 104 is shown to include a housing 106 with a bottom wall 108 having a plate 110 for securement in a filler neck. A top cover 112 is provided and is secured to housing 106 by a hinge 114.

In use, funnel 104 is employed as a typical funnel but is attached to a filler cap in the same manner heretofore described of funnel 78, with the exception, that one top cover 112 is employed for its covering.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A covered storage funnel, comprising, a housing, for being received in a filler port of an engine and serving as reservoir means for fuel or oil for dispensing said fuel or oil, a first cover pivotally secured to said housing, for covering said reservoir means and serving as a tray for parts and other articles, and means for removably securing said covered storage funnel to said filler port, wherein a second cover is pivotally secured to said housing, for covering said parts and other articles, wherein a bottom wall is integrally attached to said housing and is provided with a neck portion that receives a rubber washer and a plate that secures said housing in said filler neck, and said first cover includes a flexible first hinge fixedly secured to an outer periphery of a flange on an open portion of said first cover, and said first hinge is also fixedly secured to an outer peripheral surface of said housing, and the neck portion extends upward and is integrally attached to said first cover and includes a closure cap for filling a compartment in said housing that serves as said reservoir means, and said closure cap when open serves as vent means for said compartment, when dispensing said fuel or oil from said funnel, wherein said second cover includes a flexible second hinge that is fixedly secured to one side of said second cover and is fixedly secured to said first hinge, and a rotatable valve includes a first sleeve integrally attached to and extending upward from said bottom wall of said housing, and a bore of said first sleeve provides passageway means for fluid flow out of said compartment through an opening provided in said bottom wall, wherein said rotatable valve includes an outer second sleeve rotatably received on said first sleeve, and an opening through said first sleeve and said outer second sleeve are provided for alignment with each other for entrance of said fluid from said compartment into said rotatable valve, and said fluid passes out of said rotatable valve and said bottom wall of said housing, and said second sleeve includes a rubber O-ring in an annular groove provided on a bottom of said second sleeve, and said O-ring engages with a bottom surface of said bottom wall and provides sealing means against leakage of said fluid out of said compartment, wherein said second sleeve includes a plurality of spaced teeth that engage with similar teeth provided on a bottom of a valve cap received on said second sleeve, and said valve cap extends above said first cover, provides finger grip rotation means for said rotatable valve to open and close said rotatable valve, and an annular groove in a wall of said valve cap receives an edge of an opening through said first wall and provides sealing means in a top of said compartment of said housing.

2. A covered storage funnel as set forth in claim 1, wherein a projecting abutment is fixedly secured to a bottom outer periphery of said second sleeve of said rotatable valve and engages with a projecting stop member fixedly secured in said compartment to a top surface of said bottom wall of said housing, and when said projecting abutment engages with said stop member, the openings through said first sleeve and said second sleeve align and provides passageway means for dispensing said fluid out of said housing.

* * * * *